(12) United States Patent
Kline

(10) Patent No.: US 10,905,932 B2
(45) Date of Patent: Feb. 2, 2021

(54) TRACK-RUNNER PACING SYSTEM WITH MOVING LIGHT

(71) Applicant: Alexandra Macomber Kline, Anacortes, WA (US)

(72) Inventor: Alexandra Macomber Kline, Anacortes, WA (US)

(73) Assignee: Trackpacer LLC, Littleton, CO (US)

( * ) Notice: Subject to any disclaimer, the term of this patent is extended or adjusted under 35 U.S.C. 154(b) by 350 days.

(21) Appl. No.: 15/604,168

(22) Filed: May 24, 2017

(65) Prior Publication Data

US 2017/0259145 A1    Sep. 14, 2017

Related U.S. Application Data

(63) Continuation-in-part of application No. 14/828,863, filed on Aug. 18, 2015.

(60) Provisional application No. 62/100,329, filed on Jan. 6, 2015.

(51) Int. Cl.
| | |
|---|---|
| A63B 69/00 | (2006.01) |
| G01S 19/19 | (2010.01) |
| H05B 45/10 | (2020.01) |
| H05B 47/155 | (2020.01) |

(52) U.S. Cl.
CPC .......... *A63B 69/0028* (2013.01); *A63B 69/00* (2013.01); *G01S 19/19* (2013.01); *H05B 45/10* (2020.01); *H05B 47/155* (2020.01); *A63B 2220/12* (2013.01)

(58) Field of Classification Search
CPC . A63B 69/00; A63B 69/0028; A63B 2220/12; G01S 19/19; H05B 33/0863; H05B 37/029; H05B 33/0842
USPC ........................................................ 434/255
See application file for complete search history.

(56) References Cited

U.S. PATENT DOCUMENTS

| | | | |
|---|---|---|---|
| 1,675,972 A | 7/1928 | Cecil | |
| 2,457,968 A * | 1/1949 | Allen et al. .............. | G08B 5/36 340/323 R |
| 3,846,704 A * | 11/1974 | Bessette ............... | A61B 5/0002 128/903 |
| 5,748,981 A | 5/1998 | Patchen | |
| 6,086,379 A | 7/2000 | Pendergast | |
| 6,213,781 B1 * | 4/2001 | Kimball ............. | A63B 71/0686 273/440 |
| 6,283,612 B1 | 9/2001 | Hunter | |
| 6,617,981 B2 | 9/2003 | Basinger | |
| 6,908,066 B2 | 6/2005 | Koenig | |
| 7,317,405 B2 | 1/2008 | Weiss | |

(Continued)

*Primary Examiner* — Robert P Bullington
(74) *Attorney, Agent, or Firm* — Holley Driggs Ltd.

(57) ABSTRACT

A system for pacing a runner around a running track at a predetermined pace with a moving visual light cue. The system has at least one light strip that is positioned in sight of at least one running lane of a running track, and the light strip has a plurality of light elements that can be sequentially lighted to make it appear as if a single light source is moving along the track at predetermined pace. There is a controller for the light strip that tracks the position of a runner on the running track and selectively light one or more of the plurality of light elements of the light strip in a sequence to have the runner attempt to keep a specific pace. The controller can be dynamically updateable by the runner, and multiple systems can be used to track the runners.

17 Claims, 2 Drawing Sheets

(56) References Cited

U.S. PATENT DOCUMENTS

| | | |
|---|---|---|
| 8,543,249 B2 | 9/2013 | Chemel |
| 8,593,135 B2 | 11/2013 | Chemel |
| 9,095,762 B2 | 8/2015 | Buresta |
| 2007/0213126 A1* | 9/2007 | Deutsch .................. G07C 1/22 463/36 |
| 2007/0279494 A1 | 12/2007 | Aman |
| 2010/0118148 A1 | 5/2010 | Lee |
| 2010/0259931 A1 | 10/2010 | Chemel |
| 2010/0270933 A1 | 10/2010 | Chemel |
| 2010/0277286 A1 | 11/2010 | Burkart |
| 2010/0295473 A1 | 11/2010 | Chemel |
| 2010/0295475 A1 | 11/2010 | Chemel |
| 2010/0295482 A1 | 11/2010 | Chemel |
| 2010/0301768 A1 | 12/2010 | Chemel |
| 2010/0301769 A1 | 12/2010 | Chemel |
| 2010/0301770 A1 | 12/2010 | Chemel |
| 2010/0301771 A1 | 12/2010 | Chemel |
| 2010/0301773 A1 | 12/2010 | Chemel |
| 2010/0301774 A1 | 12/2010 | Chemel |
| 2010/0302779 A1 | 12/2010 | Chemel |
| 2011/0001438 A1 | 1/2011 | Chemel et al. |
| 2011/0153201 A1 | 6/2011 | Park |
| 2012/0091921 A1* | 4/2012 | Buresta .................. A63B 69/12 315/320 |
| 2012/0122574 A1 | 5/2012 | Fitzpatrick |
| 2013/0187553 A1* | 7/2013 | Cessna ................ H05B 37/029 315/161 |
| 2015/0035437 A1 | 2/2015 | Panopoulos |
| 2015/0087477 A1* | 3/2015 | Herold ............... A63B 71/0686 482/3 |

* cited by examiner

TRACK-RUNNER PACING SYSTEM WITH MOVING LIGHT

CROSS-REFERENCE TO RELATED APPLICATION

This application is a continuation-in-part of U.S. patent application Ser. No. 14/828,863, filed on Aug. 18, 2015, which claims priority to U.S. Provisional Application Ser. No. 62/100,329, filed on Jan. 6, 2015, the entire contents of both of which are incorporated herein by this reference.

BACKGROUND OF THE INVENTION

1. Field of the invention

The invention generally relates to athletic training equipment and systems. More specifically, the present invention relates to systems and method for tracking athletes on their pace of traverse on a running track and providing a visual light cue reflective of a predetermined pace of traverse.

2. Description of the Related Art

Some games and activities are performed on geographically predefined courses or courts. Some of these predefined courses or courts utilize visual and physical lines, such as lanes in a pool, lanes on a track, or other markings on a playing field or course. Where the sport is based upon the speed of the participant covering the distance of the course, such as in running or swimming, athletes want to maximize benefits of training by practicing at a competitive pace. During actual sports events, the pace is set by competitors. But in training, an athlete is typically training in semi-isolation, or with others not in a competitive environment, and there is no convenient system to provide the athlete with a visual indication of his or her progress relative to participating in a competitive event.

It is known to use visual aids to motivate animals involved in a race, such as systems that will entice hounds to chase a predetermined course for the purpose of racing or training. The systems use a mechanism to propel a visual lure for the hounds to chase around an enclosed track.

There are elaborate computerized training systems used with pacing lights to improve the biomechanics, distance per stroke, and aerobic metabolism of a swimmer. The system employs a computer interface which allows a coach or a swimmer to input a particular training strategy using pace lights and timing system or, alternatively, using the system's internal training program. The system provides a generator to collect data from a swimmer. A part of the training system is designed to automate the data collection routine while operating in tandem with a swim meter. Another part of the system analyses the swimmers' performance and outputs the appropriate data to the pace light controlling circuitry.

There are also extant systems for light signaling to supply a moving light reference to a swimmer or runner that includes a plurality of lighting elements, in particular light emitting diodes, arranged along a floating lane divider of a swimming pool. That system includes a control to light ones of a plurality of lighting elements according to a lighting sequence adapted to generate a moving light reference to give the swimmer and indication of a specific pace of swimming. However, these systems are typically not dynamically updateable by the swimmer, or other persons, while keeping a specific pace. Furthermore, the systems are typically unaware of the location of the swimmer relative to the target moving light, or only use one method of tracking the swimmer or runner, such as an RFID tag.

Some GPS watches provide pacing feedback, but they are impossible to read while running hard. Further, the watch itself may be incompatible with the environment (water), or the act of reading the watch may itself interfere with the training

SUMMARY OF THE INVENTION

While the invention is described in terms of running, the invention in alternative embodiments also includes swimmers, walkers, bikers, or other such sports where athletes traverse a pre-determined athletic course at a monitored pace. In one embodiment, the system for pacing a runner around a running track at a predetermined pace with a moving visual light cue has at least one light strip that is positioned in sight of at least one running lane of a running track, with the light strip containing a plurality of light elements. A controller controls the at least one light strip and can track the position of a runner on the running track and selectively light one or more of the plurality of light elements of the light strip in a sequence thereby giving a visual cue to the runner of a predetermined pace of traverse around the running track.

The controller is dynamically updated and can further include a sensor for determining the position of the runner on the track and determines the pace of traverse of the runner. The sensor can be a location transmitter worn by the runner that transmits a location signal, and the controller receives the location signal. Alternately, one or more position detectors can be positioned around the running track, such as a camera or pressure sensors, that transmit a signal to the controller indicating the position of the runner on the track. In these embodiments, the controller can then determine the pace of traverse of the runner based upon the received signals.

Additionally, the runner can have a transmitter that sends selective command signals from the runner to the controller to adjust one or more attributes of the light elements, with controller receiving the command signals sent from the runner.

In one embodiment, the controller can sequentially light individual elements of the plurality of light elements to give an appearance of continuous motion of a pacing light to the runner. The controller can also light several different elements along the light strip to cue a plurality of runners of a plurality of paces of traverse of the running track. There can also be multiple light strips around the running track where each of the elements of the at least two strips can be selectively lighted to cue two runners on two separate paces of traverse of the running track.

In a further embodiment, the light strip can further include a plurality of light elements of a plurality of colors and the controller alters the color of the light elements shown to the runner based upon predetermined criteria.

The present system therefore allows a coach or a runner to program individual training sessions to more closely control desired training speed and as a result improve performance. Lights are controlled to sequentially cascade, giving an appearance of continuous motion.

Another embodiment of the invention includes separate audio, physical, and/or visual signaling if the runner is exceeding the pre-set pace, and by how much a runner may be exceeding a pre-determined pace or an actual pace being run (or ridden on a horse or motor vehicle, or swam, or biked). The signal may be a different set of lights, or different color, disposed in the light track.

In an alternate embodiment, there can be a visual signaling of the position of another "virtual runner" on a separate path. For example, the speed and or position, typically the position, of another athlete who has run the same or similar course, can be projected on a separate light track. Consequently, a virtual race can be created, for example between the runner on the light track and one or more people who are running a similar course which is removed from the first course. The position of the runners on the separate paths would be measured in any way known in the art, for example by Radio Frequency Identification chips and sensors, photoelectric sensors, or other means known to those skilled in the art. This allows for a "virtual meet," where an athlete competes against another athlete running a similar but physically distant route at the same time, the progress of each runner being monitored by the respective controllers, and shown to the other runner as a light signal.

In one embodiment, an LED light strip is disposed along a predetermined pathway or course to indicate the desired position and speed to an athlete moving through the pathway or course, and the lights indicate to the athlete whether he is maintaining his target pace.

The present system is advantageous due to the pacing light's convenient, easily viewed placement, for example on the inner or outer perimeter of a track, or other location where the athlete can obtain visual feedback without having to make unnatural or distracting movements, e.g., look up at clock, look at watch, or the like.

DETAILED DESCRIPTION

Figure 1:
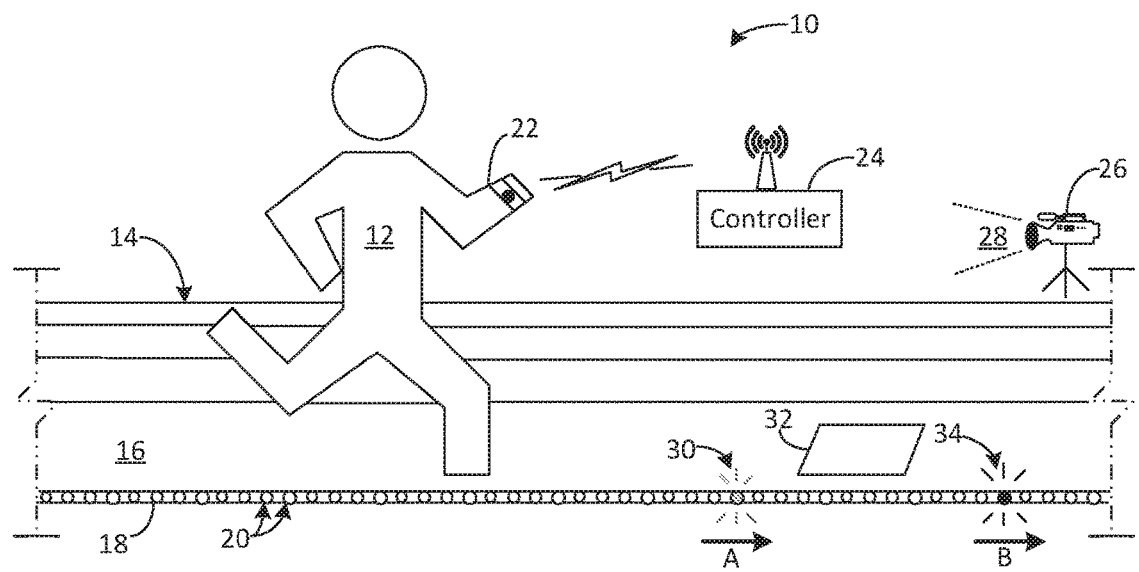
FIG. 1 is a perspective view of one embodiment of the system with a runner pacing against several moving target lights in the light strip.

Referring now to the drawings in which like numerals represent like elements throughout, FIG. 1 illustrates the system 10 for pacing a runner 12 around a running track 14 at a predetermined pace with a moving visual light cue, here shown as first light cue 30 and second light cue 34. There is at least one light strip 18 that is positioned in sight of at least one running lane 16 of a running track 14, the light strip 18 contains a plurality of light elements 20. Here, the light strip 18 is embodied as a strip of LED lights. A controller 24 controls the light strip 18, and in this embodiment, tracks the position of the runner 12 on the running track 14 and selectively lights one or more of the plurality of light elements 20 of the light strip 18 in a sequence thereby giving a visual cue to the runner 12 of a predetermined pace of traverse around the running track 14.

Here, there are two light cues 30 and 34 that are displayed to the runner 12 which can indicate different paces of traverse. For example, light cue 30 can be the best pace that the runner 12 has ever had and light cue 34 can be the track record pace.

The controller 24 is dynamically updated, either by a person inputting further commands, such as the runner or coach, and can use a variety of data for dynamically altering the training program. In one embodiment, the controller 24 determines the position of the runner 12 on the track 14 and determines the pace of traverse of the runner 12 and can dynamically update the light cue 30. In one embodiment, the controller 24 include a wireless interface and there is a location transmitter 22 worn by the runner 12 that transmits a location signal, and the controller has a receiver for the location signal. Through transmission of the location signal, the controller 24 knows where the runner 12 is and can determine the pace of traverse of the runner 12. The controller 28 sequentially lights individual elements of the plurality of light elements 20, such as cue 30, to give an appearance of continuous motion of a pacing light (or cue) to the runner 12. The motion of light cue 30 is in the direction of arrow A, and the motion of light cue 34 is in the direction of arrow B respectively.

Alternately, or in conjunction with the transmitter 22, the system 10 can include one or more position detectors positioned around the running track, such as a camera 26 or pressure sensor 32. Each of the detectors transmit a signal to the controller 24 indicating the position of the runner 12 on the track. Here, the camera 26 has a field of view 28 such that the runner 12 can be monitored as she crosses the field of view. In such embodiment, the pace calculation can be made at the camera 26 and transmitted to the controller 24. When embodied with one or more pressure sensors 32, the system 10 does not need to have the transmitter 22 on the runner 12 as the pace can be determined by the period the runner 12 traverses the one or more pressure sensors 32.

The system 10 can be embodied with a transmitter 22 carried by the runner 12 that allows the runner 12 to send selective command signals from the runner 12 to the controller 24 to adjust one or more attributes of the light elements, with the controller 24 having a receiver for the command signals sent from the runner 12. For example, the runner 12 can request the light cue 30 be slowed down or sped up, or the runner 12 can request a specific pace be shown, such as the track record.

Figure 2:
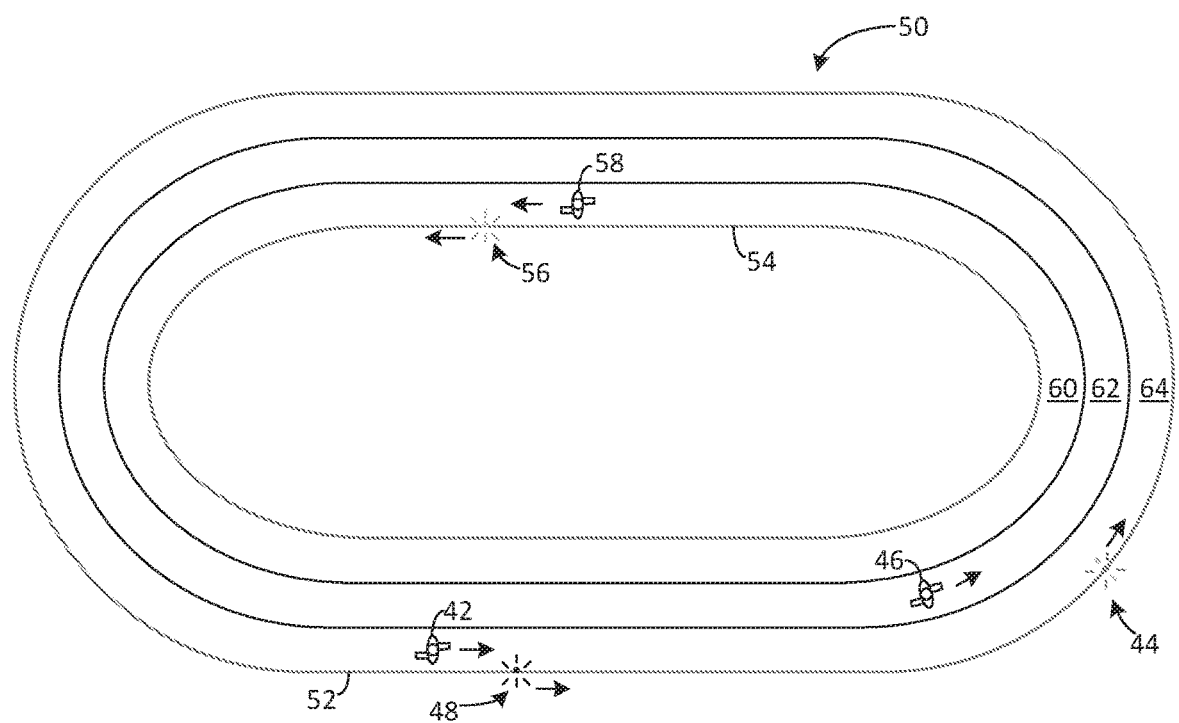
FIG. 2 is a perspective view of a track embodied with two light strips and multiple runners on the track with multiple pacing target lights.

FIG. 2 is a perspective view of a track 50 embodied with two light strips 52 and 54 and multiple runners 42, 46, 58 on the track 50 with multiple pacing target lights 44, 48, 56. Here, there is an outer light strip 52 and inner light strip 54 around the running track 50 such that each of the elements of the two strips can be selectively lighted to cue multiple runners on unique paces of traverse of the running track 50. The controller 24 can be configurable to light several different light elements 20 along a light strip, such as light strip 52, to cue a plurality of runners of a plurality of paces of traverse of the running track 50. For example, light strip 52 has a first light cue 44 for runner 46 and then a second light cue 48 for runner 42, can track each runner 42, 46 individually. Here, there is also a second light strip 54 on the inside of the track 50 that includes a light cue 56 to pace runner 58. Thus, the system 10 could be embodied such that each lane of the track 60, 62, 64 include their own respective light strip.

When the light strip 52 is embodied to include multiple light cues, it can further include a plurality of light elements 20 of a plurality of colors (not shown), and the controller 24 can be configured to alter the color of the light elements shown to runner 12. This allows a runner to be aware of the specific light cue they are being paced with based on the color of the light displayed.

In one embodiment, the LED light strip 18 contains closely spaced LED lights that sequentially light up at a given, but controller 24 variable, rate input by the runner 12. The controller 24 could include an interface with an application that can be downloaded onto a mobile phone. The application on a phone can be connected by Bluetooth to for example an Arduino microcontroller that sends electronic signals to the controller 24. The controller 24 can allow a runner 12 to preset their desired pace for each lap or fraction thereof in either miles/hour, time (i.e. a meet or world record time) for a given race distance, or sec/lap or min/miles. For example, a runner 12 could enter in that they want to run four laps at 75 seconds per lap (300 seconds total), or alternatively a first lap in 68 seconds, second and third laps at 79 seconds each, first half of fourth lap in 39 seconds and final half lap at 35 seconds (300 seconds total). Once the runner 12 has set their pace, they can push a "GO" button. Once the "GO" button is pushed, the application's interface advantageously visually and audibly counts down 5-4-3-2-1-GO at which point the runner 12 knows to begin running When the system 10 is embodied with a transmitter 22, it can provide continuous feedback to the runner 12, on every point of the track rather than once or twice a lap. Otherwise, the system 10 can track the runner 12 at various points such as in visual field 28 or at pressure sensor 32.

In one embodiment, the LED light strip 18 is of sufficient length to extend around the inner perimeter (light strip 54) or outer perimeter (light strip 52) or along a length of a track. Preferably, the LED light strip 18 is in a weatherproof or protected channel affixed to the track 14. The system 10 can include a smartphone, computer, tablet, or input device containing applications for inputting desired paces and distances into the controller 24. The controller 24 can be, for example, an Arduino microcontroller to send the electronic signals to the light strip 18, a Bluetooth Low Energy Shield (BLE 4.0) to link application interface to the Arduino, and a weatherproof container to house Arduino and Bluetooth Shield located at the track 50. In some embodiments, other types of lights can be used, for example regular incandescent light.

In more complex embodiments, the LED light strip may contain Radio Frequency Identification sensors, photoelectric sensors, or other means known to those skilled in the art for the controller or interface to monitor the runner's position. Radio Frequency Identification chips, which are cheap and light-weight, can be worn by the athlete without the athlete being even slightly impeded.

In one embodiment, when a runner 12 is ahead of the pace, the runner 12 would receive no light cue 30. Alternately, a light cue can be provided by a second light track 54, typically of different intensity and/or color than the primary light track 52. This secondary light could be extended for example several seconds ahead of the desired pace/position. Alternatively, with a single series of light track 18 used, the pace may be continuously lit but for example a number of single lights could be lit, for example where the light track has a light every 2 inches, a single light may be illuminated for example five feet ahead of the pace, ten feet ahead of the pace, and fifteen feet ahead of the pace. Different spacing and number of "leading lights" can be used for different races, as will be apparent to a trainer. For example, if three individual leading light cues are illuminated at 5, 10, and 15 feet ahead of the closely spaced primary pace lights, then if the runner can only see one leading light, then the runner knows he or she is about ten feet ahead of the position indicated by the desired or input pace. Alternatively, an audio signal can indicate how much a runner is ahead of pace.

In one embodiment, the interface for the controller 24 allows one to input into the interface of the controller 24, which then sends electronic signals to the programmable LED light strip. The electronic signals to the light strip 18 regulate the color, distance, and rate at which the LEDs will light up. The Arduino microcontroller and Bluetooth Shield will advantageously be located in the weatherproof box at the track. The LED light strip is connected to the Arduino microcontroller by one ground wire, one clock wire, and one data wire. The LED strip and wires may be enclosed in a waterproof enclosure, such as a clear plastic tube, to minimize water issues. A fourth wire is then connected to a power supply. A BLE Shield 4.0 device establishes a Bluetooth connection between a user's phone, computer, or tablet to the Arduino. Through this Bluetooth connection, the interface transmits a signal to the Arduino which then sends an electronic signal to the programmable LED strip causing the lights in it to light up at the correct rate as prescribed by the user via the interface on their phone, computer, or tablet. The interface can allow the user to preset designated distances, paces, and rest intervals.

The light strip 18 could also be a long flexible and portable cable that can be laid along other kinds of courses, such as obstacle courses. LED or other lighting sources can be used. Further, while the system 10 is described in terms of running on a track, the system 10 can be used in other activities, including swimmers, walkers, bikers, or other such sports where athletes traverse a pre-determined athletic course at a monitored pace.

In some embodiments, light can be of a particular wavelength or polarization such that the runner 12 would wear specific glasses to allow the user to only see his or her light cue 30 or 34. For example, an athlete wearing customized eyewear, for example glasses allowing horizontally orientated light to pass there-through, would see the light cue on a light track providing that signal. A runner 12 in the next track, wearing for example glasses allowing vertically orientated light to pass there-through, would not see the light from the first light track, but could see signals from a second light track, providing the second light track puts out vertically polarized light. Use of this or of focusing/blocking means will prevent a track having multiple lanes from becoming confusing.

Figure 3:
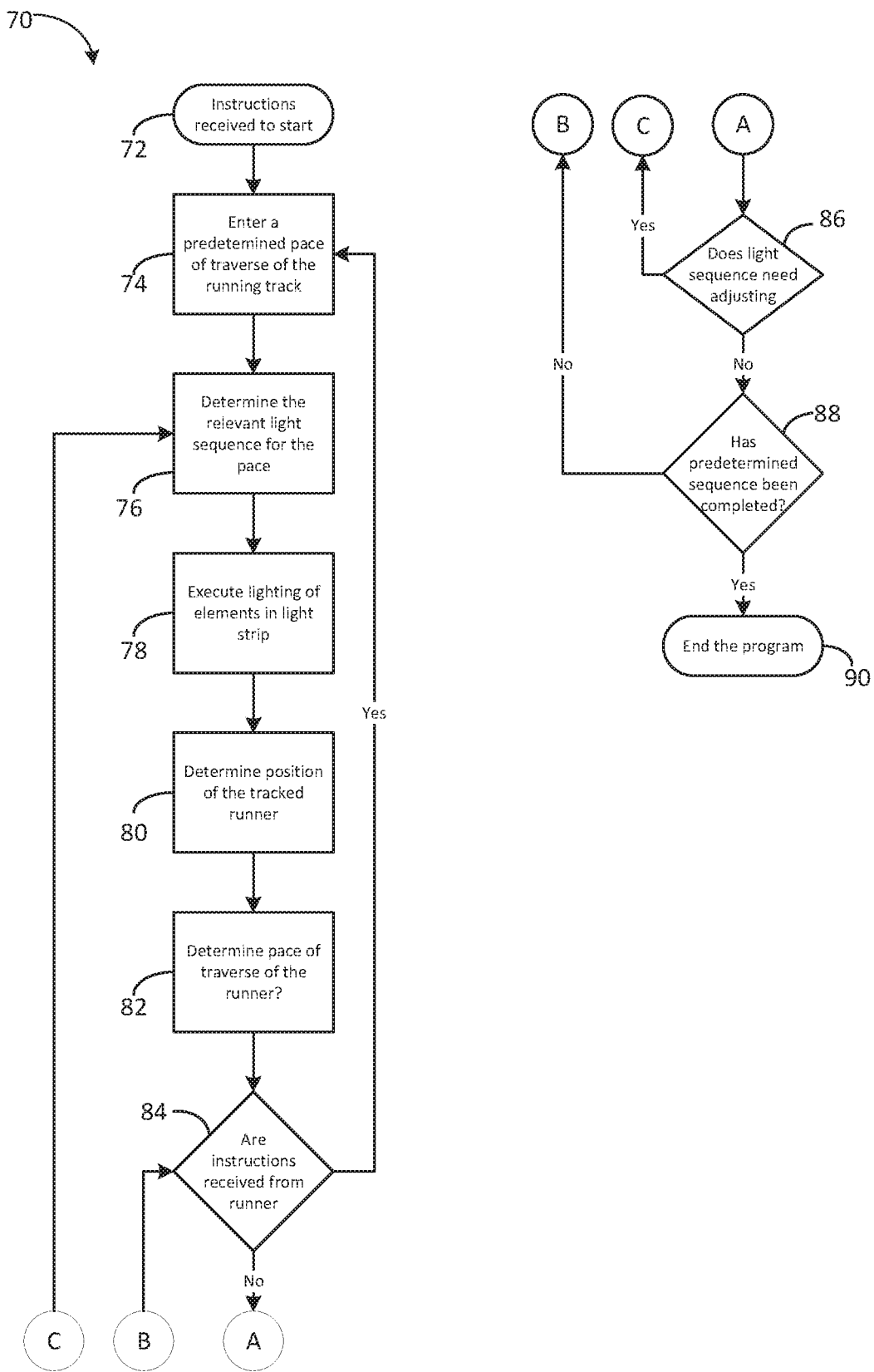
FIG. 3 is a flowchart of one embodiment of a process being executed at the controller of the system.

Referring now to FIG. 3 which is a flowchart 70 of one embodiment of a control process executing on the computer platform of the controller 24, the process starts with instructions being input in the controller 24, as shown at operation start 72. This can be the runner 12 setting a predetermined pace to be shown in the light cue 30. The predetermined pace of traverse of the running track 14 is entered, as shown at step 74, and then the controller 24 determines the relevant light sequence to display as the light cue 30 for the target pace, as shown at step 76. The controller 24 then executes the lighting of the light elements 20 in the light strip 18 to effect the target pace, as shown at step 78.

The controller 24 then determines the position of the tracked runner 14, as shown at step 80. This can occur from such actions as receiving signals from a transmitter 22 on the runner 12, receiving a signal from camera 26 that the runner is passing through the field of view 28, or the runner 12 stepping on the pressure sensor 32. The controller 24 then, in this embodiment, determines the pace of the tracker runner 12. Although, this calculation can be done elsewhere in the system, such as at transmitter 22 having an accelerometer, or at camera 26 that can determine the runner's 12 pace from the crossing of the field of view 28.

A determination is then made as to whether there have been further instructions received from the runner 12, as shown at decision 84. This step occurs when the system 10 is embodied with the runner 12 having a transmitter 22 capable of sending command signals to the controller 24. If instructions have been received from the runner 12 at decision 84, then the process reverts to entering the predetermined pace based upon the received instructions at step 74. Otherwise, if the no instructions are received at decision 84, then a determination is made as to whether the light sequence needs adjusting, as shown at decision 86. The light sequence might need adjusting, for example, if the runner 12 has sped up or slowed down on the target pace. This would also be the point to modify the light display in some aspect, such as changing the color of the displayed lights. If the light sequence does need adjusting at decision 86, then the process reverts to determine the relevant light sequence at step 76.

Otherwise, if the light sequence does not need adjusting at decision 86, then a determination is made as to whether the predetermined sequence has been completed, as shown at decision 88. If the sequence has completed at decision 88, then the program terminates, as shown at terminator 90. Otherwise, if the sequence has not been completed at decision 88, then the process iterates to decision 84 to see if the runner 12 has set commands. Thus, as embodied here, the control process is in an iterative loop between decisions 84 and 88 until the sequence has been completed, the runner 12 has input commands, or the light sequence needs adjusting.

The above is intended to be illustrative of several embodiments of the invention, and is in no way intended to limit the variation of the elements as would be known to one of skill in the art. Furthermore, the steps described herein can be performed in a variety of sequences than that described while still maintaining the intended functionality as set forth in the claims.

What is claimed is:

1. A system for pacing a runner around a running track at a predetermined pace with a moving visual light cue, comprising:
   at least one light strip that is positioned in sight of at least one running lane of the running track, the at least one light strip containing a plurality of light elements;
   a dynamically updateable controller for the at least one light strip, the dynamically updateable controller further configured to track a position of the runner on the running track and selectively light one or more of the plurality of light elements of the at least one light strip in a sequence thereby giving the moving visual cue to the runner of the predetermined pace around the running track;
   a transmitter carried by the runner, the transmitter configured to send selective command signals from the runner to the dynamically updateable controller to dynamically update the predetermined pace, the moving visual light cue, or other attribute, and
   the dynamically updateable controller further includes a receiver for the selective command signals sent from the runner.

2. The system of claim 1, wherein the dynamically updateable controller further includes a sensor for determining the position of the runner on the running track and determines a pace of traverse of the runner.

3. The system of claim 2, further comprising a location transmitter worn by the runner that transmits a location signal, and the dynamically updateable controller further including a receiver for the location signal.

4. The system of claim 2, further comprising one or more position detectors positioned around the running track, the one or more position detectors transmitting a signal to the dynamically updateable controller indicating the position of the runner on the running track, and the dynamically updateable controller further configured to determine the pace of traverse of the runner based upon the received signal.

5. The system of claim 1, wherein the dynamically updateable controller is further configured to sequentially light individual elements of the plurality of light elements to give an appearance of continuous motion of the moving visual light cue to the runner.

6. The system of claim 1, wherein there are at least two light strips around the running track where each of the plurality of light elements of the at least two strips can be selectively lighted to cue two runners on two separate paces of traverse around the running track.

7. The system of claim 1, wherein the dynamically updateable controller is further configurable to light several different elements along the at least one light strip to cue a plurality of runners of a plurality of paces of traverse around the running track.

8. The system of claim 1, wherein the at least one light strip further includes the plurality of light elements having a plurality of colors, and the dynamically updateable controller is further configured to alter the plurality of colors of the plurality of light elements shown to the runner.

9. A method for guiding a runner around a running track at a predetermined pace with a moving visual light cue, comprising:
   positioning at least one light strip in sight of at least one running lane of the running track, the at least one light strip containing a plurality of light elements;
   selectively lighting one or more of the plurality of light elements of the at least one light strip in a sequence thereby giving the moving visual cue to the runner of the predetermined pace around the running track;
   tracking a position of the runner on the running track;
   dynamically updating a controller for the at least one light strip;
   sending selective command signals from the runner from a transmitter carried by the runner;
   receiving the selective command signals from the runner at the controller to dynamically update the controller; and
   adjusting one or more attributes of the light elements.

10. The method of claim 9, further comprising determining a pace of traverse of the runner around the running track.

11. The method of claim 10, further comprising:
    transmitting a location signal from the runner to the controller; and
    receiving the location signal at the controller.

12. The method of claim 10, further comprising:
    positioning one or more position detectors around the running track;
    detecting the position of the runner;
    transmitting a signal to the controller indicating the position of the runner on the running track; and
    determining the pace of traverse of the runner based upon the received signal.

13. The method of claim 9, further comprising sequentially lighting individual elements of the plurality of light elements to give an appearance of continuous motion of the moving visual light cue to the runner.

14. The method of claim 9, further comprising selectively lighting the plurality of light elements of at least two light strips around the running track thereby cuing two runners on two separate paces of traverse around the running track.

15. The method of claim 9, further comprising lighting several different elements along the at least one light strip to cue a plurality of runners of a plurality of paces of traverse around the running track.

16. The method of claim 9, wherein the at least one light strip further includes the plurality of light elements having a plurality of colors, and further comprising altering the plurality of colors of the plurality of light elements displayed to the runner.

17. A system for guiding a person traversing an athletic course at a predetermined pace with a moving visual light cue, comprising:
- lighting means for displaying lights in sight of a path of the athletic course, the lighting means containing a plurality of light elements;
- control means for selectively lighting one or more of the plurality of light elements of the lighting means in a sequence thereby giving the moving visual light cue to the person of the predetermined pace of traverse through the athletic course, the control means dynamically updatable;
- tracking means for tracking a position of the person on the athletic course;
- a transmitter means carried by the runner, the transmitter means for selectively sending selective command signals from the runner to the control means to dynamically update the predetermined pace, the moving visual light cue, or other attribute; and
- the dynamically updateable controller further including a receiving means for receiving the selective command signals sent from the runner.

* * * * *